United States Patent
Liu et al.

(10) Patent No.: US 11,016,934 B2
(45) Date of Patent: May 25, 2021

(54) AUTOMATED CONTENT-BASED AND CONTEXT-BASED FILE ORGANIZATIONAL STRUCTURING

(71) Applicant: International Business Machines Corporation, Armonk, NY (US)

(72) Inventors: Kai Liu, Maiden, MA (US); Su Liu, Austin, TX (US); Zhichao Li, Austin, TX (US); Manjunath Ravi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/275,621

(22) Filed: Feb. 14, 2019

(65) Prior Publication Data

US 2020/0265011 A1    Aug. 20, 2020

(51) Int. Cl.
*G06F 16/20* (2019.01)
*G06F 16/13* (2019.01)
*G06F 16/901* (2019.01)
*G06F 16/185* (2019.01)

(52) U.S. Cl.
CPC .......... *G06F 16/137* (2019.01); *G06F 16/185* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 6,473,749 B1 | 10/2002 | Smith et al. | |
| 7,779,358 B1 | 8/2010 | Gupta et al. | |
| 2005/0160107 A1 | 7/2005 | Liang | |
| 2015/0161129 A1* | 6/2015 | Miller | G06F 16/40 707/728 |
| 2016/0171549 A1* | 6/2016 | Rozental | G06F 16/951 705/14.6 |
| 2019/0012476 A1* | 1/2019 | Dorogoy | H04L 63/20 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Belix M Ortiz Ditren
(74) *Attorney, Agent, or Firm* — Heslin Rothenberg Farley & Mesiti P.C.; Noah Sharkan, Esq.

(57) ABSTRACT

A method, computer program product, and a system where a processor(s), subject to obtaining permission, monitors browsing activity of an application browsing sources, including analyzing the sources to identify keywords and calculate densities of the keywords in content accessed at the sources. The processor(s) retains the keywords and the densities of the keywords in the content accessed at the sources in an historical record. The processor(s) downloads a resource of data and metadata from a source. The processor(s) updates the metadata of the resource based on keywords and densities of the keywords in the resource and source. The processor(s) determines a destination for the downloaded resource, based on selecting the destination comprising a highest percentage of attributes matching the updated metadata.

20 Claims, 10 Drawing Sheets

(56) References Cited

OTHER PUBLICATIONS

Disclosed Anonymously, "Intelligent Placement of Downloads or Bookmarks"—IPCOM000235588D, Mar. 10, 2014, 3 pages.
Disclosed Anonymously, "Smart Folder System Easy for User to Find Relevant Resources",—IPCOM000208639D, Jul. 14, 2011, 4 pages.
Disclosed Anonymously, "Smart File System Navigation Based on User Behavior",—IPCOM000215291D, Feb. 24, 2012, 10 pages.
Smart Install Manager : System Administrator's Guide Smart Notebook SE for Mac Computers, Smart Technologies, Canada, Aug. 2009, 24 pages.

\* cited by examiner

600

[TRAVEL, 3.09%] - [GUIDE, 2.78%] - [LANDING, 2.58%] - [STATES, 1.55%] - [HOTELS, 1.44%] - [TOP, 1.19%] - [VACATIONS, 1.08%] - [GETAWAYS, 0.93%] - [CRUISES, 0.88%] - [RESTAURANTS, 0.77%] - [RESORTS. 0.62%] - [SKYLINE, 0.57%] - [THINGS, 0.57%] - [BEACH, 0.57%] - [TOWN, 0.52%] - [DESTINATIONS, 0.52%] - [CHARLESTON, 0.52%] - [COSTA, 0.46% - [MAUI, 0.46%] - RICA, 0.46%] - [BANGKOK, 0.46%] - [SAN. 0.46%] - [TIPS, 0.46%] - CHICAGO, 0.46%] - [CITY, 0.46%] - [ BUENOS, 0.41%] - [VEGAS, 0.41%] - [ BARCELONA, 0.41%] - [AIRES, 0.41%] - [CITIES, 0.26%] - [ROOMS, 0.24%] - [MUSEUMS, 0.17% -...-[TOTAL WEIGHTS(PLACEHOLDER)]

FIG. 6

AUTOMATED CONTENT-BASED AND CONTEXT-BASED FILE ORGANIZATIONAL STRUCTURING

BACKGROUND

As Internet browsing becomes more popular and prevalent in both recreational and industrial settings, the resources utilized from various web resources are downloaded locally for further reference and utilization. For example, certain updates to programs are downloaded locally, as are informational files for further user utilization. Resources downloaded to local and/or global destinations accessible to the computing node upon which a user browses the Internet; these resources can include, but are not limited to, files, images, music, videos, etc. Generally, a destination for the downloaded resources is configured as a default, such as a local/Downloads folder. Due to the heavy utilization of resources from the Internet, it would not be uncommon for a given user to have accumulated a significant number of resources at this location (e.g., over 200 documents and over 50 unzipped folders). For example, over a year, a given user could accumulate 9.68 GB of data in a default download location, and this could data include 2 applications, 277 documents, and 29 folders. Because usage of Internet resources, and thus, downloading of resources, is dynamically increasing over time, managing the increased number of resources deposited at this default location is growing more challenging, especially as the size of the repository (default location) grows.

The default downloads folder utilized as a repository for downloaded resources is a consistent construct across different computer systems. On computing nodes that run Windows, Mac, and Linux Operating Systems, a single folder serves as a default location for all downloads (e.g., C://Downloads, //Users/{username}/Downloads, or /home/user/Downloads). Commonly utilized web browsers typically send downloads to these default download folders, automatically. Thus, the contents of the download locations grow over time and provide little utility because the lack of organization provides limited insight into the resources themselves.

SUMMARY

Shortcomings of the prior art are overcome and additional advantages are provided through the provision of a method for designating a destination for a downloaded resource. The method includes, for instance: monitoring, by one or more processors, browsing activity browsing activity of an application executing on a computing device, wherein the browsing activity comprises accessing content on various servers over a network connection, wherein a portion of the servers comprise sources for downloadable resources, and wherein the monitoring comprises analyzing, by the one or more processors, the sources to identify keywords and calculate densities of the keywords in content accessed at the sources; retaining, by the one or more processors, the keywords and the densities of the keywords in the content accessed at the sources in an historical record on one or more memories communicatively coupled to the computing device; downloading, by the one or more processors, from a given source of the sources, a resource, wherein the resource comprises data and metadata; updating, by the one or more processors, the metadata of the resource, wherein the updating comprises: analyzing, by the one or more processors, the resource to identify keywords and calculate densities of the keywords in the data comprising the resource; extracting, by the one or more processors, from the historical record, a portion of keywords and densities of the keywords in content accessed at the given source, wherein the keywords comprising the portion are equivalent to the keywords in the data comprising the resource; combining, by the one or more processors, the keywords and the densities of the keywords in the data comprising the resource and the portion to establish merged keywords and merged densities of merged keywords; and updating, by the one or more processors, the metadata of the resource with the merged keywords and the merged densities of merged keywords; determining, by the one or more processors, a destination for the downloaded resource, based on selecting, from a group of potential destinations, the destination comprising a highest percentage of attributes matching the updated metadata; and saving, by the one or more processors, the downloaded resource to the destination.

Shortcomings of the prior art are overcome and additional advantages are provided through the provision of a computer program product for designating a destination for a downloaded resource. The computer program product comprises a storage medium readable by a processing circuit and storing instructions for execution by the processing circuit for performing a method. The method includes, for instance: monitoring, by the one or more processors, browsing activity browsing activity of an application executing on a computing device, wherein the browsing activity comprises accessing content on various servers over a network connection, wherein a portion of the servers comprise sources for downloadable resources, and wherein the monitoring comprises analyzing, by the one or more processors, the sources to identify keywords and calculate densities of the keywords in content accessed at the sources; retaining, by the one or more processors, the keywords and the densities of the keywords in the content accessed at the sources in an historical record on one or more memories communicatively coupled to the computing device; downloading, by the one or more processors, from a given source of the sources, a resource, wherein the resource comprises data and metadata; updating, by the one or more processors, the metadata of the resource, wherein the updating comprises: analyzing, by the one or more processors, the resource to identify keywords and calculate densities of the keywords in the data comprising the resource; extracting, by the one or more processors, from the historical record, a portion of keywords and densities of the keywords in content accessed at the given source, wherein the keywords comprising the portion are equivalent to the keywords in the data comprising the resource; combining, by the one or more processors, the keywords and the densities of the keywords in the data comprising the resource and the portion to establish merged keywords and merged densities of merged keywords; and updating, by the one or more processors, the metadata of the resource with the merged keywords and the merged densities of merged keywords; determining, by the one or more processors, a destination for the downloaded resource, based on selecting, from a group of potential destinations, the destination comprising a highest percentage of attributes matching the updated metadata; and saving, by the one or more processors, the downloaded resource to the destination.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 is an example of a data structure generated by program code in some embodiments of the present invention;

DETAILED DESCRIPTION

Figure 1:
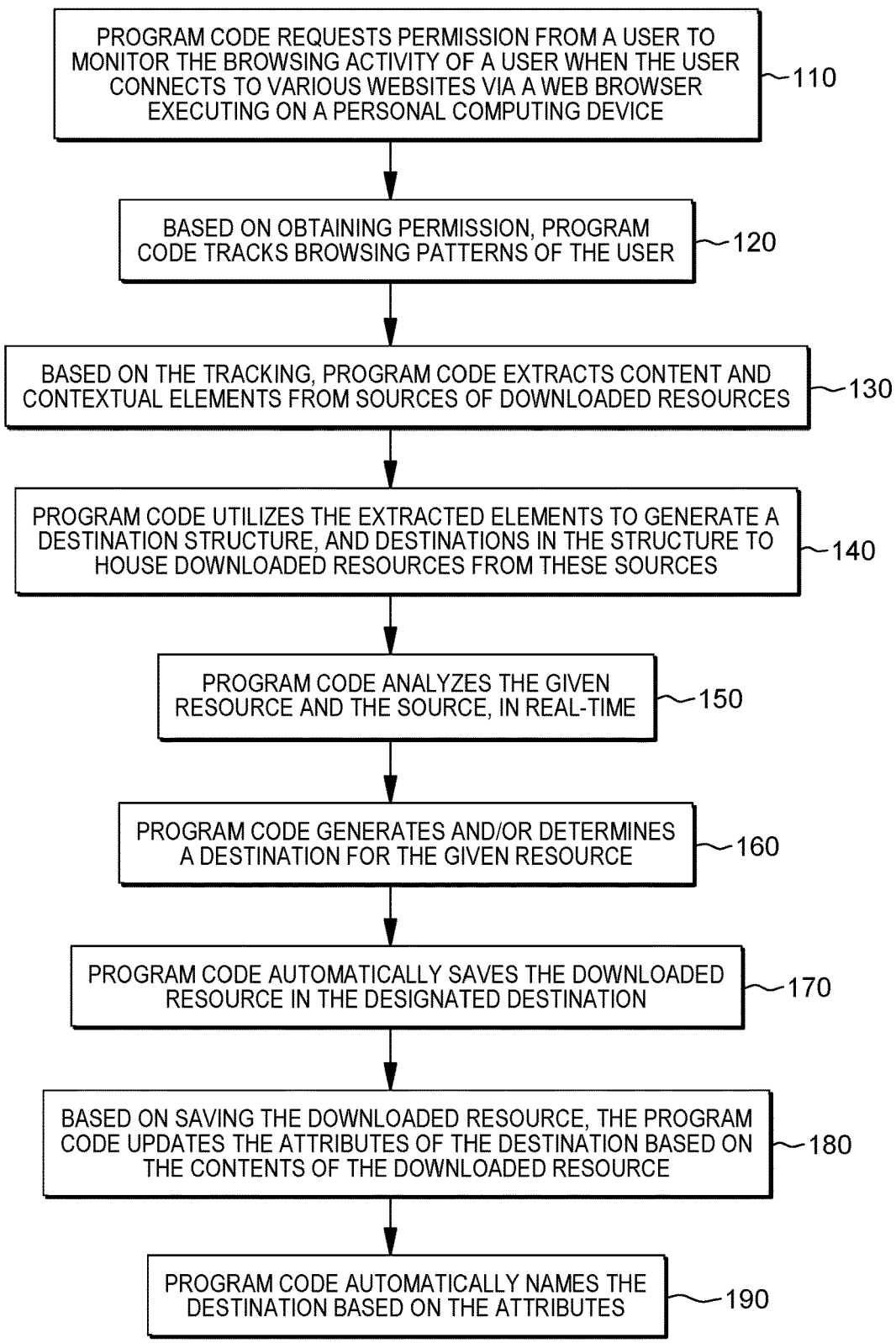
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 9:
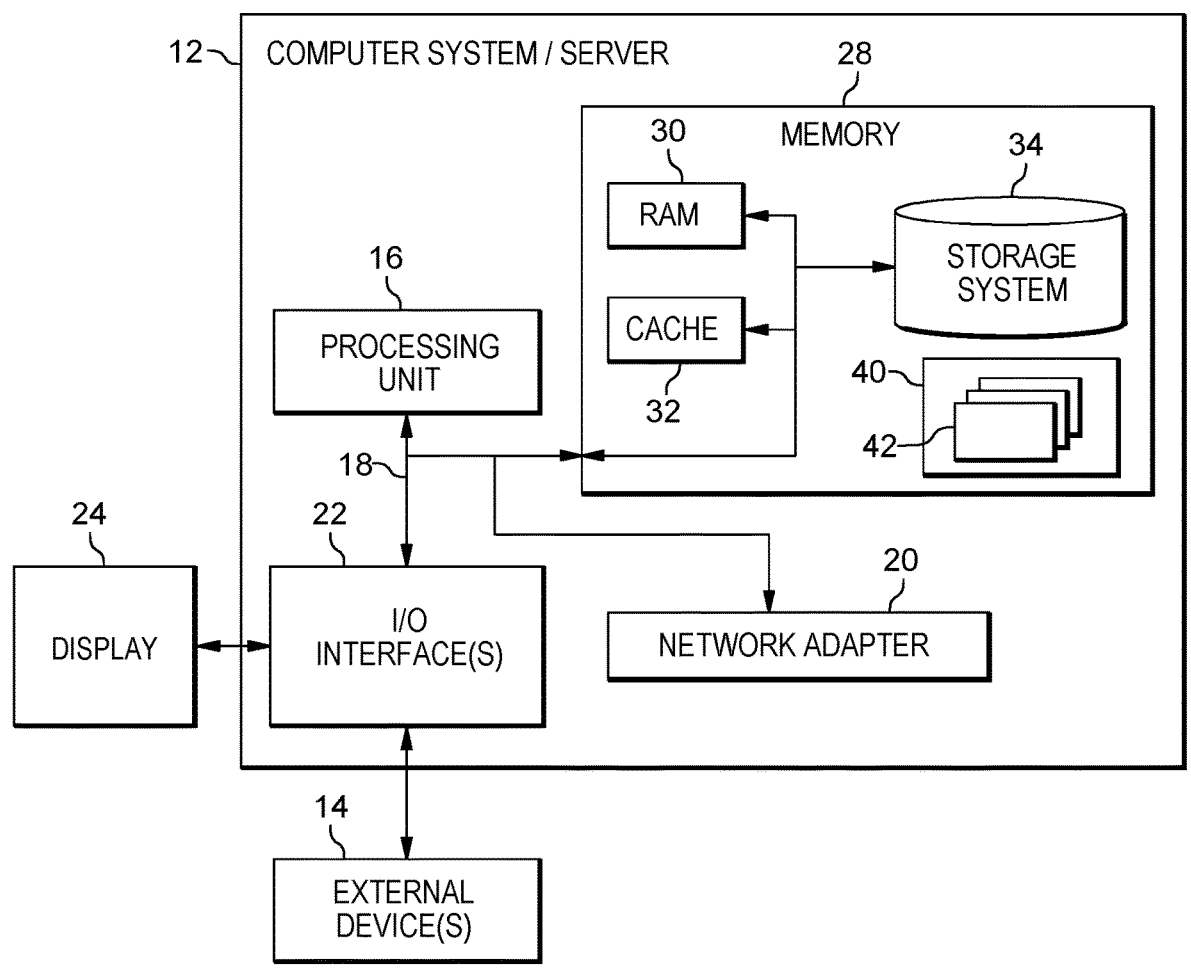
FIG. 9 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 9 as program/utility 40, having a set (at least one) of program modules 42, may be stored in memory 28.

Embodiments of the present invention include a computer-implemented method, a computer program product, and a computer system that include program code executed on at least one processing circuit that enables intelligent selection of a local folder (or locally accessible folder or location) to store downloaded resources, based on the one or more of the category and/or the content of the file. Resources include various data downloaded from computing nodes and systems in communication with the computing device by which the data is downloaded, for retention locally and/or on a global resource communicatively coupled to the computing device. Resources include, but are not limited to files, images, music, videos, etc. In some embodiments of the present invention, program code executing on one or more processors extracts keywords from source websites and metadata of downloaded resources to determine categories of downloaded resources and what local and/or global destination to store them in. For the sake of simplicity and illustration, a destination for downloaded resources is at times referred to herein as a folder. In some embodiments of the present invention, the program code automatically determines a destination for one or more downloaded resources. The invention can also track an identified (with the express permission of the user) user's browsing patterns and history (e.g., sites visited and how long the user navigated on the site) and utilize this browsing history data and timing to inform the destination for a downloaded resource.

Some embodiments of the present invention include a computer-implemented method, a computer program product, and a computer system that include program code executed on at least one processing circuit that: 1) maps a structure (e.g., hash map, linked list, tree, etc.) of destinations for resources downloaded via browsing sessions; 2) contemporaneous with downloading each resource, extracts contextual elements from one or more of a source of the resource and/or the resource; 3) determines and/or generates a destination in the structure for each resource; 4) updates the criteria of the destination based on resources associated with the destination; and 5) saves each resource in the designated destination. In some embodiments of the present invention, the program code: 1) obtains permission from a user to track Internet and resource browsing and download activities; and 2) based on obtaining this permission (e.g., through registration or express ascent), tracks user browsing behaviors to identify patterns or habits, including but not limited to, hyperlinks selected by the user (via a web browser executing on a computing device) on pages of various websites, and/or time spent by the user viewing various pages on various websites (via the web browser). In embodiments of the present invention, the program code maps the structure of destinations based on one or more of tracked user activity and/or data extracted from resources downloaded by a user and/or the sources of those resources.

In some embodiments of the present invention, the structure is a folder structure and the destinations are electronic folders. These folders can be stored locally, on the computing device utilized by the user to communicate with other computing nodes, over a network, including browsing various websites over the Internet, and/or these folders can be stored on a shared computing resource in a distributed computing system, including but not limited to, a cloud computing system.

In some embodiments of the present invention, extracting contextual elements from one or more of a source of the resource and/or the resource including the program code extracting keywords including by extracting metadata to identify elements such as name, file type, nature of content, etc. Elements extracted from sources of the resources (e.g., websites) can include data identifying the sources, the nature of the sources, the content of the sources, data characterizing the content of the sources, etc. In some embodiments of the present invention, when the program code determines and/or generates the destination in the structure for each resource, the program code determines and/or generates the destination by associating the destination extracted keywords of the resources (e.g., files) stored in at the destination and/or at a parent destination in the structure (e.g., folders, and/or directory). In some embodiments of the present invention, the program code determines a destination for a given downloaded resources based on comparing keywords extracted from the resource and the source of the resource (e.g., website) to keywords associated with the destination. The program code can designate a target destination based on the target destination, in the structure, having the most keywords matching the keywords of the resource and/or source out of the potential destinations in the structure.

In some embodiments of the present invention, the program code determines and/or generates the destination based, at least in part, on the tracked user activity. The program code can determine, based on tracking activity of a user, during source browsing (web browsing), with the permission of the user, rank and/or the importance of various download destinations (e.g., folders). Based on the browsing behavior of the user, associated with various sources from which downloads originate, the program code can designate a given destination as a target destination for one or more resources based on that destination being a common destination for important downloads, as indicated by the user spending longer amounts at the source prior to downloading the current resource (for which the program code is making the determination). The program code can make determinations of destinations for newly downloaded resources based on establishing behavioral patterns for the user's download activity, including, but not limited to, designating a target destination based on a certain time of day and/or the usage of the user of the computing device during that time of day.

Embodiments of the present invention are inextricably tied to computing at least because they are directed to automatically generating and designating destinations for downloaded resources, enabling an improved utilization of a computing device. As discussed above, in some embodiments of the present invention, program code monitors (with the permission of the user) browsing activities of the user utilizing the computing device and analyzes prior downloaded resources, as well as, in real-time, newly downloaded resources, in order to both build an organizational structure and destinations for the resources and to retain the resources in targeted destinations. This program code generates a repository of downloaded resources that are more easily useable, comprehensible, and searchable, thus eliminating the accumulation of unused files in a repository that can negatively impact the performance of the computing device. Additionally, embodiments of the present invention are implicitly tied to computing because they address an issue that is unique to computing, the accumulation of resources in a default directory.

Aspects of embodiments of the present invention provide advantages over existing approaches to managing downloaded resources. Existing approaches do not automatically generate and designate destinations for downloaded resources, enabling an improved utilization of a computing device, based on resource and source content and user activity. Rather, some existing approaches organize downloaded images, exclusively, based on the location where the images were captured, based on the location of the devices utilized to capture the images. Aspects of various embodiments of the present invention provide significantly more than this existing approach at least by automatically designating destinations for resources, broadly, based on content from the resources and their sources, including but not limited to, keywords. Some existing approaches for organizing electronic data center on the organization of email messages within an email client. However, these approaches are exclusive to email and do not analyze keywords, including program code no do these approaches generate a metadata structure for each downloading a resource, as does program code in certain embodiments of the present invention. While utilizing the structure (e.g., hash map, linked list, tree, etc.) can accelerate the performance of designating a destination, generating a structure in embodiments of the present invention, differs from email sorting and searching, which is employed in existing approaches to organize email messages, at least because the program code dynamically updates the structure based on the contents of websites and other sources for resources navigated to by a user. In embodiments of the present invention, program code determines resource types of downloaded resources dynamically, and can update the target destination and structure, in a real time update, which is not contemplated in existing email sorting approaches. Another advantage of embodiments of the present invention over existing email-specific organizational systems is that program code in some embodiments of the present invention, with the permission of the user, maintains a log or record of historical sites and utilizes the history as attributes in metadata utilized to generate the structure. By maintaining this history, program code in embodiments of the present invention can identify the resource types with more expediency, having a history of resources originating at a common source. Finally, some existing approaches to folder management are limited to identifying attributes and weighting factors in resources, to determine importance, as each folder is associated with a business rule. But in some embodiments of the present invention, program code, in automatically generating and designating destinations for downloaded resources, recognizes resource content type and features (e.g., audio, video, file type, etc.) from keywords in the resources and at the sources of the resources (e.g., websites) and generates metadata for each resource and organizes each resources based on the metadata associated with the resource.

Figure 2:
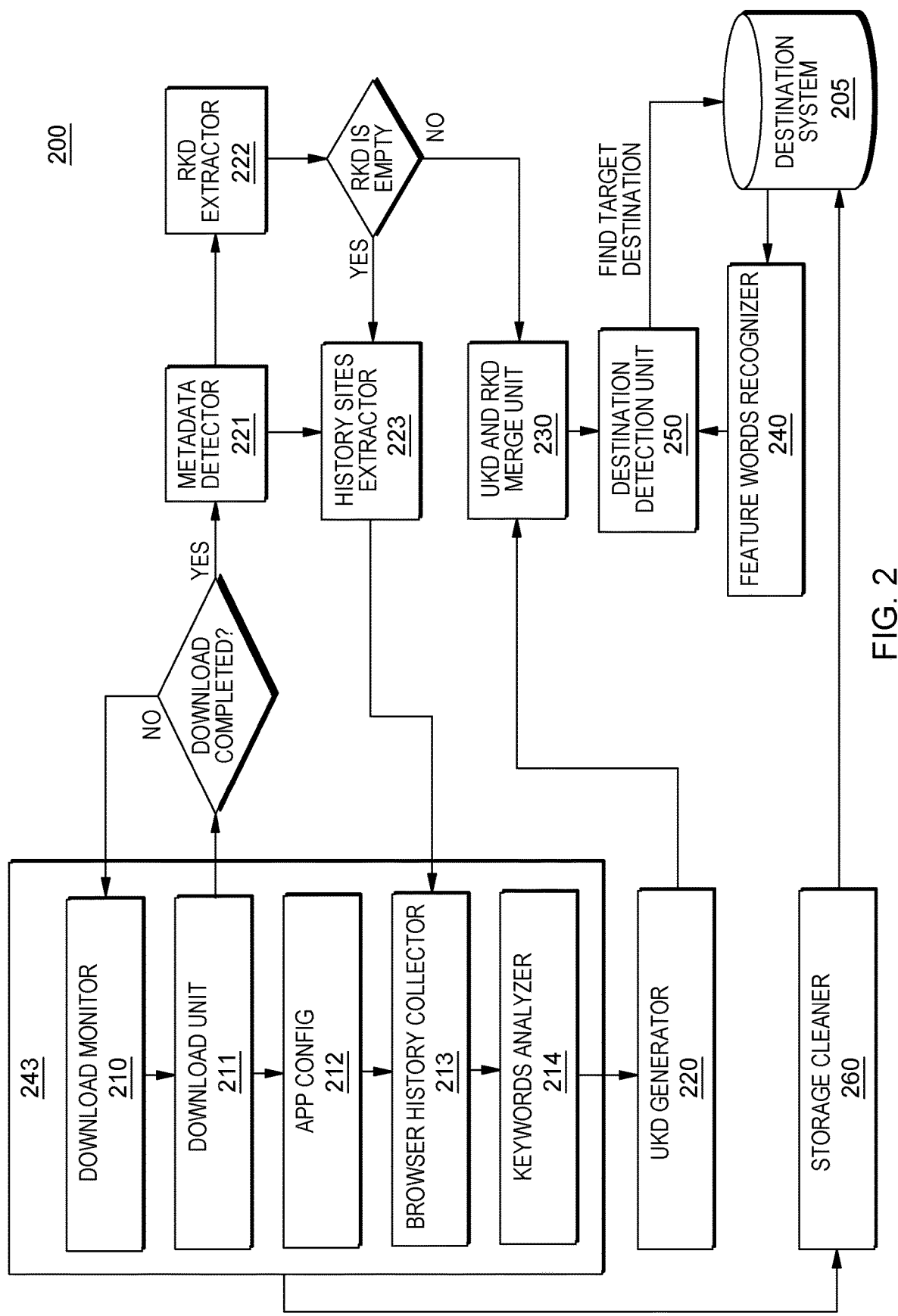
FIG. 2 illustrates a technical framework that includes certain technical aspects of some embodiments of the present invention.

FIG. 1 is a workflow 100 that illustrates certain aspects of some embodiments of the present invention and in particular, illustrates how program code, executing on one or more processors, in some embodiments of the present invention automatically determines and//or generates a destination (e.g., folder) for a downloaded resource (e.g., file, document, image, video, music, application, etc.). Meanwhile, FIG. 2 illustrates a technical framework 200 that includes certain technical aspects of some embodiments of the present invention.

Turning first to FIG. 1, in some embodiments of the present invention, program code requests permission from a user to monitor the browsing activity of a user when the user connects to various websites via a web browser executing on a personal computing device (110). Based on obtaining permission, the program code tracks browsing patterns of the user (120). In some embodiments of the present invention, the program code tracks user activity, including locations (e.g., websites, web pages) a user has browsed and the timing and activity of the user at each location, for a predetermined amount of time. The program code can also track what type of files or resources (e.g., exe, pdf, gif, jpg, zip, txt, xml, etc.) the user downloads from the various locations. In some embodiments of the present invention, when the program code determines a destination for a given download, the program code can reference activity of a user for a given period of time immediately preceding the given download (e.g., n minutes before the download). The browsing activity before the download can be relevant because one can infer that the longer a user browses to locate a resource before downloading the resource, the higher quality the resource can be. Resources located in a similar amount of time can be this same level of quality and therefore, can be retained in a destination of a similar importance level.

In some embodiments of the present invention, the program code analyzes both individual downloads, in real-time, as well as the sources, optionally both in real-time and during monitoring of browsing, to generate a structure and destinations along the structure, in which to retain downloaded resources from the sources. Returning to FIG. 1, based on the tracking, in embodiments of the present invention, the program code extracts content and contextual elements from sources of downloaded resources (130). In some embodiments of the present invention, the content includes keywords and/or metadata. The program code utilizes the extracted elements to generate a destination structure, and destinations in the structure, that will ultimately house downloaded resources from these sources (140). Data collected and analyzed by the program code from sources based on tracking user activity that can be utilized in generating the structure includes, but is not limited to: 1) the amount of time spent on each source (e.g., website) because the more active time spent at a source, the more density the program code can assign to keywords captured at this source; 2) selected hyperlinks on one source/site to another source, as the program code can assign more density to the overlapping keywords from both sources; 3) locations (sources) from which resources are downloaded, as the program code can assign high density on keywords from a target website where a download is triggered; and/or 4) keywords utilized by a user interacting with content through searching, grouping, merging, etc., as the program code can utilize these selected keywords as being associated with downloaded resources and sources located through these activities.

As discussed above, in some embodiments of the present invention, the program code generates a structure of destinations based on analyzing density of keywords based on user browsing behavior. As discussed above, the user agrees to the monitoring, during which the program code gathers the data to enable this analysis, further enabling the program code to generate the structure. The program code can analyze the density of various keywords based on at least: 1) extracting keywords from a user selecting hyperlinks on websites; and 2) observing the length of time a user spends on a given site. Word density refers to the frequency at which a word appears in one or more of a source for a resource for downloading and/or in the downloaded resources itself. The program code can locate the words to determine density in various parts of a given source.

Below is an example of an analysis of word density that can be performed by the program code in some embodiments of the present invention. In this example, a user is has navigated to a website, https://example.com/en/download/os_download.jsp, where a new version of a high level programming language called "test" is available as a resource. The program code analyzes the text of the webpage and locates certain recurring words and assigned a density to each word depending on the frequency with which it appears at the source. This initial webpage is referred to throughout this example as Site 1. The program code detects these recurring words or keywords from the hyperlink, the title, and the body, of the webpage (source). The word, count (per keyword), and density (based on the count) determined by the program code is illustrated in Table 1 below.

TABLE 1

| Word | Count | Density |
| --- | --- | --- |
| Test | 40 | 15.75% |
| Download | 13 | 5.12% |
| runtime | 8 | 3.15% |
| machine | 5 | 1.97% |
| vm (virtual machine) | 5 | 1.97% |
| environment | 5 | 1.97% |
| plugin | 4 | 1.57% |
| virtual | 4 | 1.57% |
| downloads | 3 | 1.18% |
| computer | 3 | 1.18% |
| tre (test runtime environment) | 3 | 1.18% |
| tvm (test virtual machine) | 3 | 1.18% |
| ... | | |

The program code continues to monitor the user (with the permission of the user) when the user navigates away from this initial webpage (e.g., away from Site 1). The user navigates to another source, in this example, by selecting a hyperlink on the webpage (initial source), which directs the user/browser to a second source, another webpage, https://example.com/en/download/help/. This other webpage is referred to throughout this example as Site 2. Hence, the user navigates from Site 1 to Site 2. The program code determines where there are overlaps in keywords between the sources (e.g., Site 1 and Site 2) in order to assess the density of these keywords. For the new webpage/source, the word, count (per keyword), density (based on the count), and whether there is an overlap with the initial source, as determined by the program code, is illustrated in Table 2 below.

TABLE 2

| Word | Count | Density | Overlap |
| --- | --- | --- | --- |
| test | 41 | 11.78% | Yes |
| update | 6 | 1.72% | Yes |
| tre | 6 | 1.72% | Yes |
| version | 5 | 1.44% | Yes |
| versions | 4 | 1.15% | No |
| issues | 4 | 1.15% | Yes |
| security | 4 | 1.15% | Yes |
| running | 4 | 1.15% | No |
| error | 3 | 0.86% | No |
| center | 3 | 0.86% | No |
| ... | | | |
| developers | 2 | 0.57% | No |
| name | 2 | 0.57% | No |
| section | 2 | 0.57% | No |
| virtual | 2 | 0.57% | Yes |

Returning to FIG. 1, when downloading a given resource, in some embodiments of the present invention, the program code analyzes the given resource and the source, in real-time (150). For example, the program code can extract keywords from the source (e.g., source website) to determine a category of the download resource, as well as from the resource, itself. Thus, the program code obtains can utilize element it obtained in advance of the download and during the download to as referenced for capturing and determining the correct category of the given download.

In embodiments of the present invention, the program code analyzes density based on browsing behavior (monitored with the permission of the user). As aforementioned, the program code extracts keywords from a user selecting hyperlinks on websites (potential sources of resources downloaded). The program code can determine the density of keywords utilizing the equation below. Site 1 and Site 2 refer to the initial and other site in which the keywords are illustrated in Table 1 and Table 2, respectively.

$$density=(density1[from\ site1]+density2[from\ site2]+ densityN[from\ siteN])/N$$

Returning to FIG. 1, the program code generates and/or determines a destination for the given resource (160). As a structure was generated in advance of the download, the program code can locate within the structure, a destination for the given resource. However, if no resource fits the given download from an element, category, file type, attribute, keyword, etc., standpoint, the program code can generate a new node in the structure to accommodate the given resource. In some embodiments of the present invention, the structure is a tree and the destinations on the structure are nodes. Thus, the structure can comprise a tree structure for local folders and each node of the tree stores a featured word list for each folder it represents. The words can be assigned weights by the program code, which can also impact the destination determined by the program code. In some embodiments of the present invention, the program code assigns the given download to a destination based on determining total weights associated with the keywords of the resource and/or the source of the resource, the density of the keywords, and individual weight of the keywords. The program code can utilize a detection algorithm to search the structure to identify an appropriate target destination for the given resource. In some embodiments of the present invention, the program code can recommend, to the user, a name and/or naming convention for generated destinations in the structure, based on the resources assigned to the destinations. In some embodiments of the present invention, the program code implements the naming automatically.

In determining a destination for a given resource (160), in some embodiments of the present invention, the program code determines a download category based on keyword density from sources (e.g., sites) visited by the browser previous to and/or during the downloading. The program code utilizes the higher density keywords to assign the resource to a destination comprising resources with similar keywords. Using Site 1 and Site 2 as an example, the program code can determine a category for a given download (e.g., tre (test runtime environment)), file name tre-8u144-macosx-x64.dmg). The program code determines common keywords, which have a high density (e.g., test, tre) and which words, uncommon keywords (e.g., machine) have a decreasing rate of density, when compared to common keywords. Table 3 is an example showing a calculation by the program code of density of keywords for the "tre" download across Site 1, which can be understood as a target site, and Site 2, which can be understood as a relevant site (the site to which a user navigated via hyperlink after "targeting" the target site, specifically, through a browser).

TABLE 3

| Density[Keyword] | (Target Site+ | Relevant Site)/ | 2 = | Density |
|---|---|---|---|---|
| density[test] | (15.75% + | 11.78%)/ | 2 = | 13.77% |
| density[tre] | (1.18% + | 1.72%)/ | 2 = | 1.45% |
| density[machine] | (1.97% + | 0)/ | 2 = | 0.99% |

In determining a destination for a given resource (160), as aforementioned, the program code can observe the length of time a user spends on a given site, and utilize this data in part of a density calculation and, ultimately, to determine a destination for a given downloaded resource. Hence, the more time a user spends on a given site (source), the greater the density. The equation below is an example of a determination of density utilizing the time spent at a given source, utilizing, for illustrative purposes only, Site 1 and Site 2. The site "n" is added to the equation to illustrate that although this example has been utilizing two sites, the program code can utilize more sites to determine keyword density. In the equation below, "T" is the total time window when user was browsing sites for quality information and "$t_n$" is time spent on site n within total time T.

$$density=[keyword(s)\ density\ from\ site1]*t_1/T+ [keywords\ density\ from\ site2]*t_2/T+\ldots+[keyword(s)\ density\ from\ siten]*t_n/T$$

As discussed above, data collected and analyzed by the program code from sources based on tracking user activity that can be utilized in generating the structure (140). Thus, in some embodiments of the present invention, this structure includes a Hash Map with Key-Value pairs, generated by the program code. The program code determines keywords and densities of the keywords and stores the keywords and their densities in a Hash Map with Key-Value pairs, where the Key is the string of keywords and Value is the density (e.g., <test,13.77%>, <tre,1.45%>, <machine,0.99%>, etc.).

Returning to FIG. 1, the program code tracks browsing patterns of the user (120) (with permission), extracts content and contextual elements from sources of downloaded resources (130), utilizes the extracted elements to generate a destination structure, and destinations in the structure, that will ultimately house downloaded resources from these sources (140), analyzes a given (downloaded) resource and/or the source, in real-time (150), and generates and/or determines a destination for the given resource (160). When the program code generates a structure (140), generating the structure (e.g., the hash map discussed above) can include downloading a metadata structure as a download resource. The program code utilizes this metadata structure to recording and track Internet resource information, including the source (e.g., origin site) for each resource. When a resource is distributed over Internet, metadata can be utilized to keep track of its historical uploads and downloads by users, and based on these uploads and downloads, the program code can generate, as illustrated above, resource keywords and density (referred to as RKD, for ease of understanding). Each resource on Internet is unique regarding to the RKD of the resource. Below is pseudocode that illustrates downloading of a resource by program code in an embodiment of the present invention.

```
Download Resource {
Name,
Type(.png, .mp3, .zip, .dmg, .wmv ...),
Timestamp(YYYY-MM-DD HH:MM:SS),
RKD(HashMap<word, density>),
Site (e.g., http:// example.com/en/download),
Historical Sites(List<String>)
}
```

Figure 3:
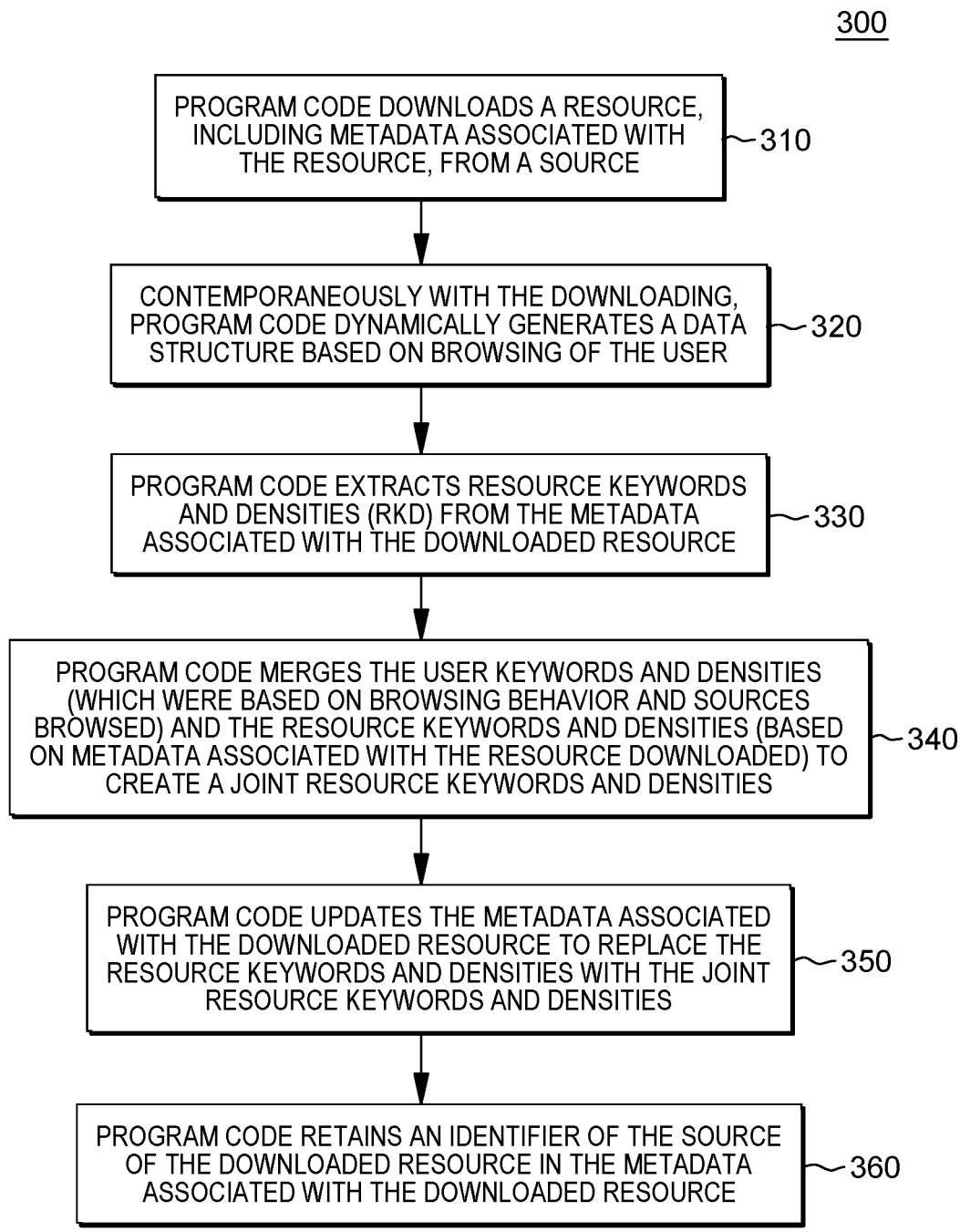
FIG. 3 is a workflow illustrating certain aspects of an embodiment of the present invention.

The program code dynamically generates data that ultimately enables the program code to determine a destination for the given resource (160) in some embodiments of the present invention, in real-time, at the time of performing the download. FIG. 3 is a workflow 300 that illustrates details of the program code utilizing content and contextual elements from sources of downloaded resources (e.g., FIG. 1, 130) and analyzing the given (downloaded) resource and/or the source, in real-time (e.g., FIG. 1, 150), to determinate a destination for a given resource at download, by the program code (e.g., FIG. 1, 160).

Turning to FIG. 3, in some embodiments of the present invention, the program code downloads a resource, including metadata associated with the resource, from a source (e.g., site) (310). Contemporaneously with the downloading, the program code dynamically generates a data structure based on browsing of the user (320). In some embodiments of the present invention, the data structure can comprise the Hash Map with Key-Value pairs discussed above and can be understood as a dynamically generated user keywords and densities (UKD) hash map, based on the user browsing. The program code extracts resource keywords and densities (RKD) from the metadata associated with the downloaded resource (330). In an embodiment of the present invention, the program code merges the user keywords and densities (which were based on browsing behavior and sources browsed) and the resource keywords and densities (based on metadata associated with the resource downloaded) to create a joint resource keywords and densities (340). The program code updates the metadata associated with the downloaded resource to replace the resource keywords and densities with the joint resource keywords and densities (350). The program code retains an identifier of the source of the downloaded resource in the metadata associated with the downloaded resource (360). In some embodiments of the present invention, the identifier is retained in a "site" attribute and can comprise a URL. By retaining the source in the metadata, the program code can utilize this attribute as an endpoint to correlate the resource with its origin, enabling the program code to detect, at the source and at destinations for downloaded resources, version updates and/or deprecates. In some embodiments of the present invention, the program code identifies, in a download destination, based on the source, an older version of the downloaded resource and automatically cleans the destination (storage) of this older version. In some embodiments of the present invention, the program code updates the metadata with sharing data. For example, for popular resources that are sharing with one another via email attachment or cloud storage (e.g., web-enabled email, web-enabled file sharing, social media sites, etc.), the program code retains, in the metadata, one or more historical sharing server address/site (e.g., temp email server, cloud storage URL, etc.). The program code can retain this data as an historical sites attribute in the metadata associated with the downloaded resource, track the origin of the resource, and maintain the accuracy of RKD.

Returning to FIG. 1, in some embodiments of the present invention, the program code determines a destination for the given resource that will ultimately house downloaded resources from these sources (160) by utilizing the extracted elements to generate a destination structure, and destinations in the structure, (140). In some embodiments of the present invention, the program code maintains two types of data structures in a local and/or locally accessible remote and/or shared computing resource that comprise this structure. The program code utilizes the data structures to store attributes of destinations. For example, the destination can include folders and the attributes can include featured words (e.g., keywords) and weights of folders. The process of determining a destination (e.g., target folder) for a given downloaded resource can be accomplished by applying a destination detection algorithm to locate a target destination for the downloaded resource.

Figure 4:
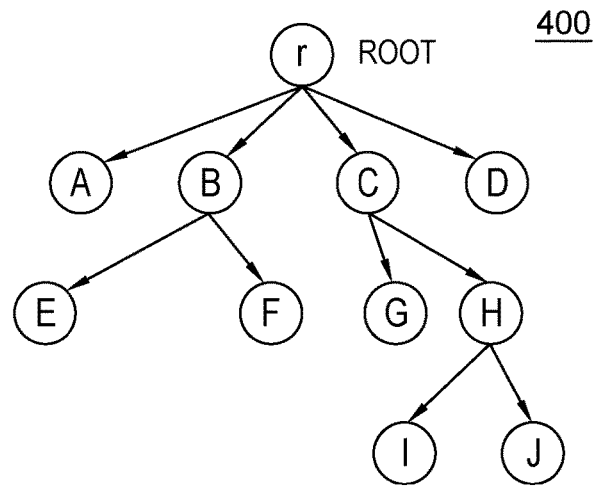
FIG. 4 is an example of a data structure generated by program code in some embodiments of the present invention.

The two types of data structures generated by the program code in some embodiments of the present invention include: 1) a tree structure comprising nodes; and 2) the nodes of the tree structure, which themselves are linked list structures. FIG. 4 is an example of a tree structure 400 in this hierarchy, where the destinations are organized into a computer folder structures comprises of nodes and FIG. 5 is a structure that represents each node of the tree structure 400 as a linked list structure 500.

Referring to FIG. 4, a tree structure 400 includes computer folders that are destinations A-J, wherein each destination A-J is a node, which can represent a folder and/or a subfolder. In some embodiments of the present invention, the structure 400 also includes a root r. In the tree structure 400, each entry (with the exception of the last entry) in the list is storing a featured word (e.g., keyword) and its weight [word, weight]. The weight represents a featured percentage of each word within the folder. The weights of all the featured words for a given node add up to approximately 1 (i.e., a whole). In embodiments of the present invention, the program code uniquely determined the featured percentage of each destination (e.g., folder A-J) utilizing the words and their weights, structured into a list. The last entry in the list can be a placeholder to store total weights [total weights] after the program code applies the destination detection algorithm to locate a target destination for the downloaded resource. The program code applies the destination detection algorithm to identify the target destination by comparing various possible destinations (e.g., folders A-J). When the data structure generated by the program code is a tree structure 400, based on parent-child node A-J inheritance, featured words in child nodes are similar category (e.g., in a similar category) to featured words in parent nodes. However, the terms or featured words in the child nodes can include more specificity than those in the parent nodes.

Figure 5:
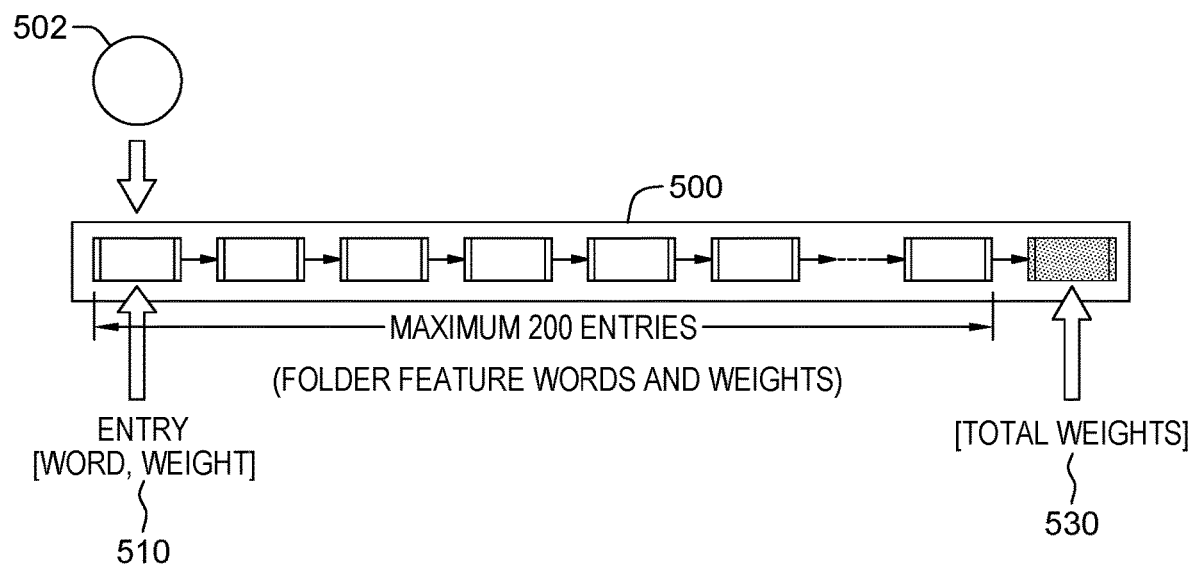
FIG. 5 is an example of a data structure generated by program code in some embodiments of the present invention.

Referring to FIG. 5, which is an example linked list structure 500 which comprises a node A-J (FIG. 4) of the tree structure 400 (FIG. 4) in some embodiments of the present invention. In each node 502, the linked list structure 500 comprises a list of featured words (e.g., keywords) and their weights (e.g., density) for each node, which is generated by the program code as contents under the node A-J (FIG. 4). For example, using the tree structure of FIG. 4, a list of node C can be generated by the program code by utilizing its inheritance nodes, G, H, I, J. A list of node H can be generated by the program code by combining node I and J. In this particular example, as indicated in FIG. 5, and for illustrative purposes only, there are at most 200+1 entries in each list, as 200 entries of [word, weight] plus 1 entry of [placeholder] to store total weights. In some embodiments of the present invention, the program code orders the featured words in the linked list structure 500 in descending order, based on weight. Thus, the left side of the structure includes a word of an entry word weight 510 and the last word in the structure 520 has the highest weight and is held in the structure before a total weights 530 value stored by the program code. The total weights 530 value is a placeholder. FIG. 6 is an example of the contents of a linked list. In this example, the program code analyzed documents stored at a destination related to travel, including travel guides and plans, and based on the contents, detected featured words (e.g., extracted keywords) and determined the weights of the featured words to generate the list 600 of FIG. 6.

Returning to the FIG. 5, in this example, as aforementioned, the program code ranked the words in a linked list structure 500 in descending eight order with words ranking beyond 201$^{st}$ excluded from the structure. The program code uniquely determined each node by its featured words and weights. In some embodiments, the program code recommends a name for the destination (node comprising the linked list) based on feature words created from previous steps. As discussed above, although subfolders can share several feature words with parent folder, the program code determined weights individually and thus, the weights will differ depending on focus of each folder, thus resulting in a unique ranking of words (even if the words are common) in each node or destination (e.g., folder).

As illustrated in FIG. 3, the program code updates the metadata associated with the downloaded resource to replace the resource keywords and densities with the joint resource keywords and densities (350). The program code utilizes this metadata to determine a destination for the downloaded resource (e.g., FIG. 1, 160). To illustrate the FIG. 7 includes both structures, the tree structure 710, which includes nodes A-J which each comprise individual linked lists 720a-720b generated by the program code, which individually are provided in FIGS. 4-5, and metadata (e.g., RKD) from a download 730. Although linked lists 720a-720b are only provided from two of the nodes D, K, for ease of understanding, in the illustrated embodiment, each node A-J comprises a linked list. After downloading a resource, the program code updates the RKD metadata (as discussed in FIG. 6), the program code applies a destination detection algorithm to identify a target destination by comparing various possible destinations (e.g., folders A-J) to the RKD of the download 730.

Figure 7:
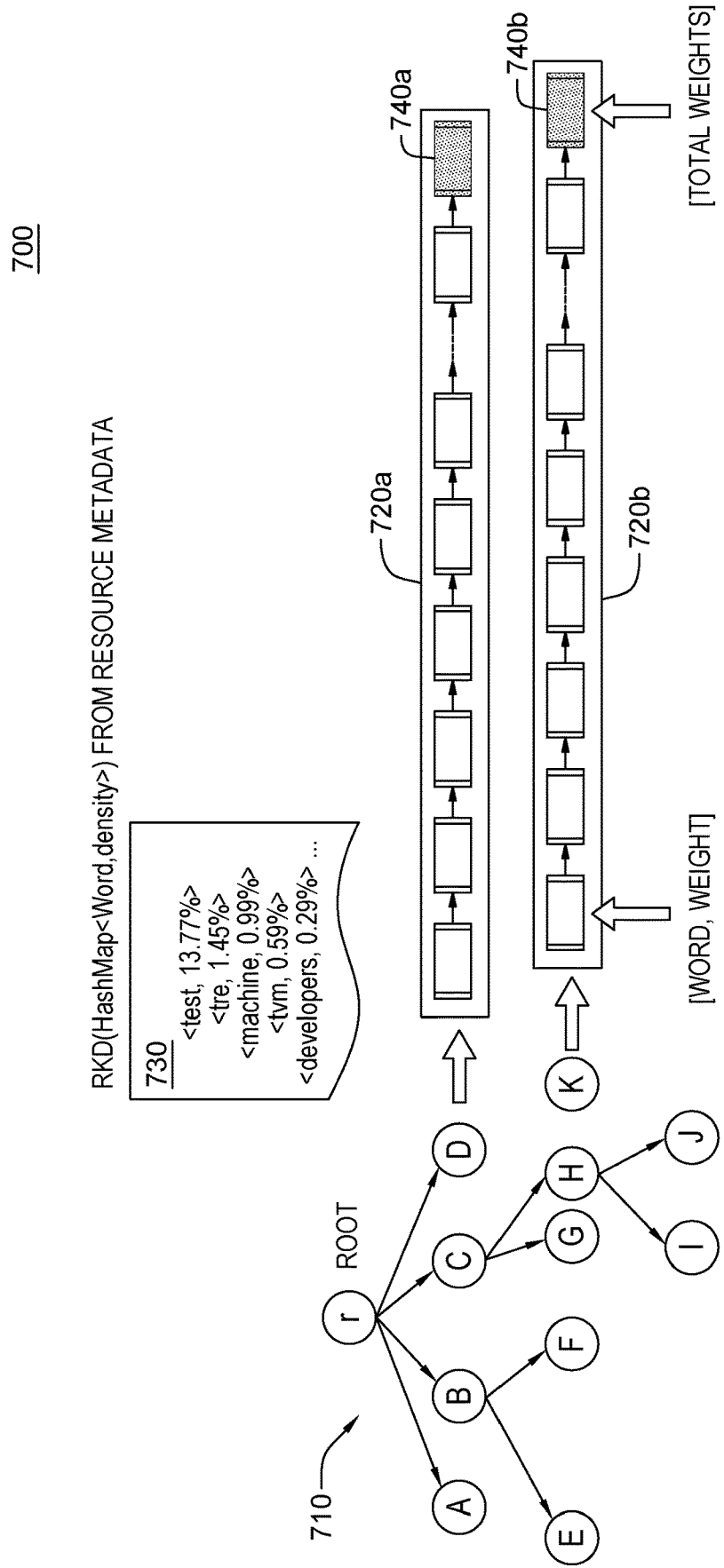
FIG. 7 an illustration of the interactions of various data structures that comprise various aspects of some embodiments of the present invention.
Figure 8:
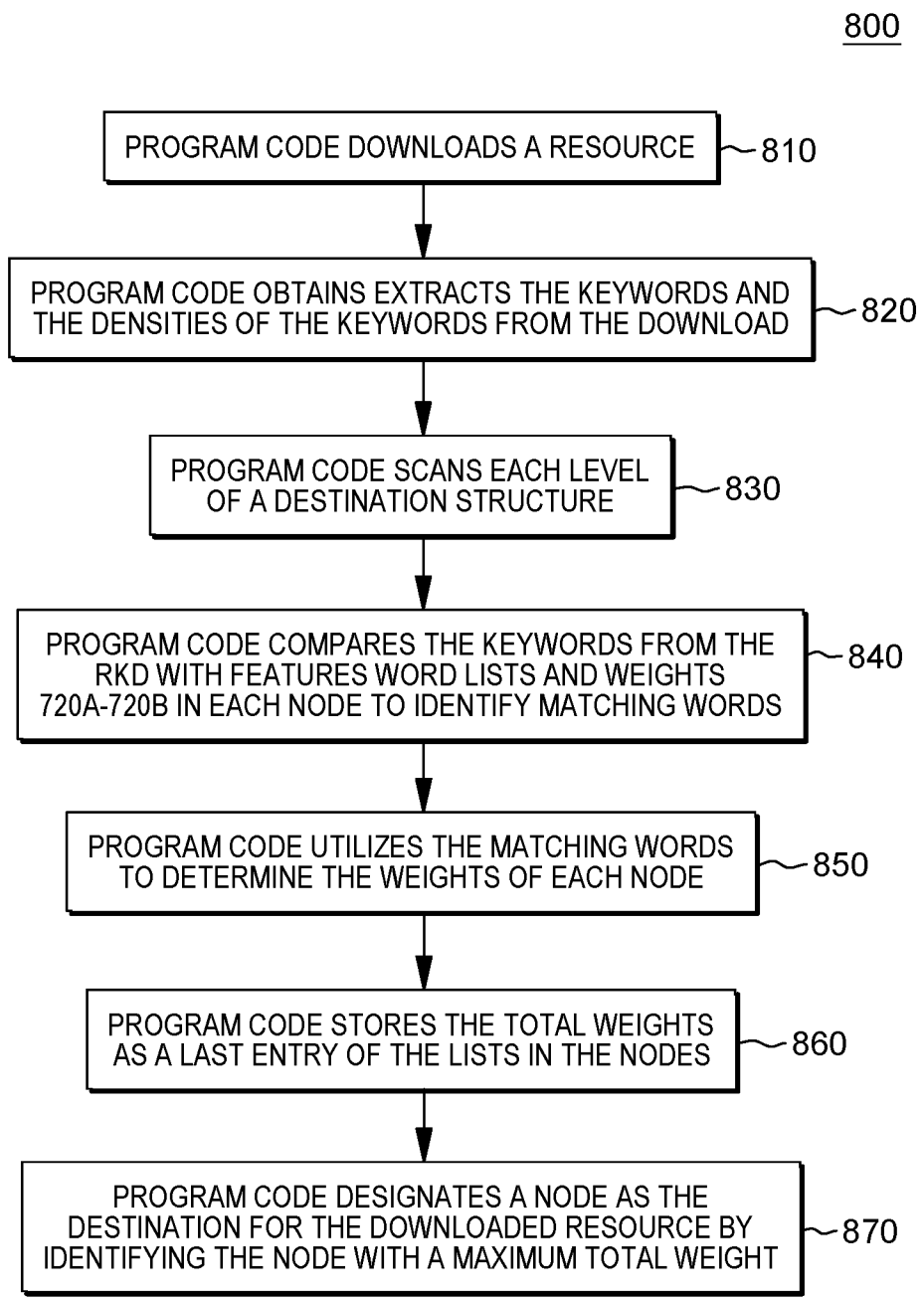
FIG. 8 is a workflow illustrating certain aspects of an embodiment of the present invention.

FIG. 7 provides a visual representation 700, of how the program code utilizes this metadata to determine a destination for the downloaded resource (e.g., FIG. 1, 160). FIG. 8 is a workflow 800 that illustrates this determination in more detail in some embodiments of the present invention. Thus, references are made to both FIG. 7 and FIG. 8 for illustrative purposes. In an embodiment of the present invention, the program code determines a target destination (e.g., node, folder) by searching the data structure, in this example, a tree structure 710. To determine (or generate) a destination, the program code downloads a resource (810). The program code obtains extracts the keywords and the densities of the keywords from the download (e.g., by referencing a Hash Map<Keyword, Density>Pairs in the RKD 730) (820). The program code scans each level of a destination structure (e.g., tree structure 710) (830). In some embodiments of the present invention, the program code employs breadth-first-scan to accomplish this scanning. During the scanning, the program code compares the keywords from the RKD 730 with features word lists and weights 720a-720b in each node A-J to identify matching words (840). The program code utilizes the matching words to determine the weights of each node A-J (850). In some embodiments of the present invention, the program code utilizes the following equation to determine to total weights of the nodes with the matched words. In the equation below, density[i], weight[i] are density and weight from matching word i, respectively.

$$\text{Total weights}=\{density[1]*weight[1]+density[2]*weight[2]+\ldots+density[N]*weight[N]\}*100$$

Returning to FIG. 8, in some embodiments of the present invention, the program code stores the total weights 740a-740b as a last entry of the lists 720a-720b in the nodes A-J (860). The program code designates a node A-J as the destination for the downloaded resource by identifying the node with a maximum total weight 740a-740b (870).

Returning to FIG. 1, in some embodiments of the present invention, once the program code has designated a given destination for saving the downloaded resource (160), the program code automatically saves the downloaded resource in the designated destination (e.g., folder) (170). In some embodiments of the present invention, based on saving the downloaded resource, the program code updates the attributes of the destination based on the contents of the downloaded resource (e.g., keywords, density) (180). In some embodiments of the present invention, the program code automatically names the destination based on the attributes (190). In some embodiments of the present invention, the program code suggests a name for the designated destination to the user and the user can accept or reject the recommendation through a user interface.

FIG. 2 illustrates a technical framework 200 that includes certain technical aspects of some embodiments of the present invention. For ease of understanding, certain functions have been assigned to singular modules and/or computing node. Certain of the functionalities have also been combined, visually, to signify that they can run on one or more common processors of a computing device 243. However, as understood by one of skill in the art, various aspects can be embodied in a singular module and/or computing node and/or computing device. As aforementioned, monitoring of user activity, including web browsing and downloading, is performed by the program code with the consent of the user. Some embodiments of the present invention include program code performing as a download monitor 210, to monitor and track download events of a computing device utilized by a user. The download monitor 210 interacts with a download unit 211, which can be an embedded system downloader, which, without the integration of aspects of the present invention into the system and/or method, would default to a browser downloader, thus, placing all downloads in a default location. Embodiments of the present invention also include program code to configure applications and/or systems 212 (i.e., app config 212)) executing on the computing device and capable of downloading content, via the download unit 211, to enable the program code to track browser activity and perform keyword analysis, under user consent. As discussed in FIG. 1, embodiments of the present invention also includes program code to perform as a browser history collector 213, to collect data during browsing for analysis in destination generation and assignment for downloaded resources. As discussed above, the browser history collector 213 program code collects data that is relevant to determining the keywords and densities (RKD) from the metadata associated with a downloaded resource. The program code also includes a keyword analyzer 214, to identify and analyze keywords from both sources as well as resources.

Program code referred to as the UKD generator 220 utilizes data from a download monitor 210, download unit 211, as configured through application configuration 212, a browser history collector 213, and keyword analyzer 214, the latter of which analyzes the data from monitoring browsing, to generate a hash map with key-value pairs discussed above and can be understood as a dynamically generated user keywords and densities (UKD) hash map, based on the user browsing. The program code of the UKD generator 220 detects user keywords and density, and creates a UKD hash map according to keywords count.

When program code downloads a resource, program code referred to as the metadata detector 221 retrieve metadata from the downloaded resource. At download, program code of an RKD extractor 222 retrieves resource keywords and density, and creates an RKD hash map. Program code of a history sites detector 223, detects a list of historically visited sites from metadata. The program code merges the UKD and the RKD to update the metadata associated with the downloaded resource. In the illustration, this merging is handled by program code of a UKD&RKD merge unit 230.

Once the program code has downloaded a resource, the program code determines a destination for the resource in a destination system 205, including but not limited to a folder system. The destination system 205 can be located in a local computer storage system (e.g., drive /C, drive /D, drive /E, /Users/(username), and/or /home/user/). In order to determine a destination for a downloaded resource, the program code performs feature word recognition 240, meaning that the program code analyzes destinations in the destination system 205 and obtains destination (e.g., node) feature words and weights. The program code also applies a destination detection algorithm, based on UKD and RKD (e.g., as inputs), in order to detect a destination 250. By applying a destination detection algorithm, which is illustrated in FIGS. 3 and 8, the program code of the destination detection unit 250 searches a structure of the destination system 205 to identify a target destination. The program code can also provide recommendations in naming folders according to featured lists of each destination (e.g., node).

In order to maintain the performance and efficiency of the destination assignments and generation, in some embodiments of the present invention, program code comprising a storage cleaner 260 periodically cleans outdated downloads and releases storage. The program code detects outdated downloads based on the download monitor 210 and tracking historical site from a resource's metadata.

Embodiments of the present invention include a computer-implemented method, a computer program product, and computer system, where program code executed by one or more processors monitors browsing activity browsing activity of an application executing on a computing device, where the browsing activity comprises accessing content on various servers over a network connection, where a portion of the servers comprise sources for downloadable resources, where the monitoring comprises analyzing, by the one or more processors, the sources to identify keywords and calculate densities of the keywords in content accessed at the sources. The program code retains the keywords and the densities of the keywords in the content accessed at the sources in an historical record on one or more memories communicatively coupled to the computing device. The program code downloads, from a given source of the sources, a resource, where the resource comprises data and metadata. The program code updates the metadata of the resource, where the updating comprises: contemporaneous with the downloading, analyzing the resource to identify keywords and calculate densities of the keywords in the data comprising the resource; extracting, from the historical record, a portion of keywords and densities of the keywords in content accessed at the given source, where the keywords comprising the portion are equivalent to the keywords in the data comprising the resource; combining the keywords and the densities of the keywords in the data comprising the resource and the portion to establish merged keywords the merged densities of merged keywords; and updating the metadata of the resource with the merged keywords and the merged densities of merged keywords. The program code determines a destination for the downloaded resource, based on selecting, from a group of potential destinations, the destination comprising a highest percentage of attributes matching the updated metadata. The program code saves the downloaded resource to the destination. The program code can obtain permission to monitor the browsing activity. The program code can analyze the resource to identify keywords and calculate densities of the keywords in the data comprising the resource is contemporaneously with downloading the resource.

In some embodiments of the present invention, the program code generates a name recommendation for the destination, where the generating is based on the attributes matching the updated metadata. In some embodiments of the present invention, the program code names the destination based on the name recommendation.

In some embodiments of the present invention, the group of potential destinations comprise nodes on a tree structure, and each node comprises a folder.

In some embodiments of the present invention, the destination attributes comprise an ordered linked list comprising featured words in weight order, where the weight order is based on a frequency of each featured word in files stored at the destination prior to the downloading.

In some embodiments of the present invention, the program code updating the metadata of the resource with the merged keywords and the merged densities of merged keywords comprises generating a hash map comprising the merged keywords and the merged densities of merged keywords.

In some embodiments of the present invention, the program code updates the metadata of the resource by: extracting, from the historical record a second portion of keywords and densities of the keywords in content accessed at a portion of the sources, where the portion of the sources comprise sources accessed by the application within a predefined period of time before accessing the given source, where the keywords comprising the second portion are equivalent to the keywords in the data comprising the resource; and updating the metadata of the resource based on the second portion.

In some embodiments of the present invention, the program code updates the metadata of the resource to include an identifier of the given source. The program code retains, at the destination, the metadata of the resource.

In some embodiments of the present invention, the program code determines the destination for the downloaded resource further by: generating a data structure comprising a tree structure with nodes, where the potential destinations comprise the nodes. Each node of the nodes can comprise attributes stored in a linked list.

In some embodiments of the present invention, the program code updates a value at the destination to reflect the highest percentage of attributes matching the updated metadata, where the value comprises an entry of a linked list of a node comprising the destination.

Referring now to FIG. 9, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, destination system 205 (FIG. 2), destination detection unit 250 (FIG. 2), and computing device (243) can each be understood as a cloud computing node 10 (FIG. 9) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
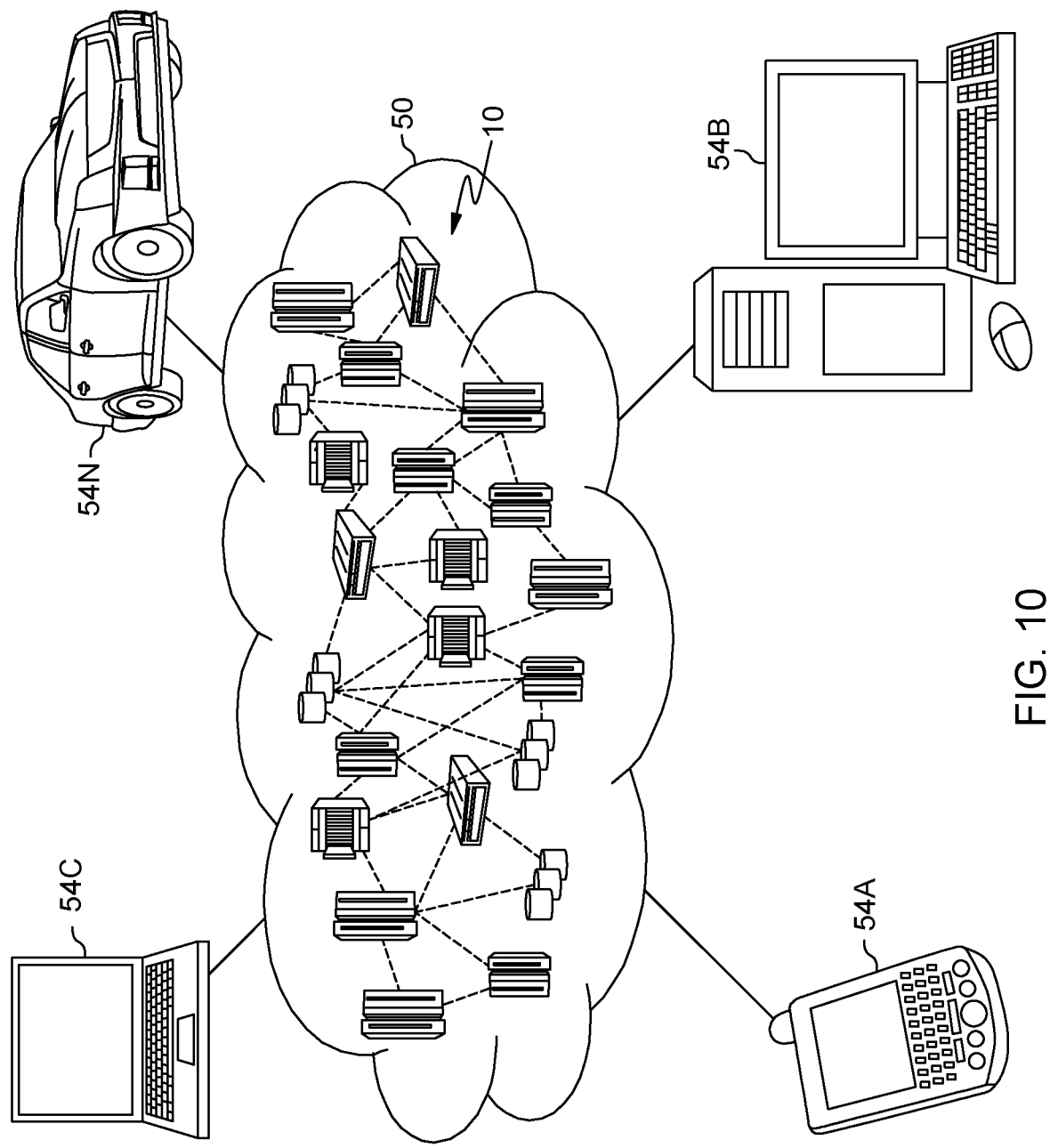
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
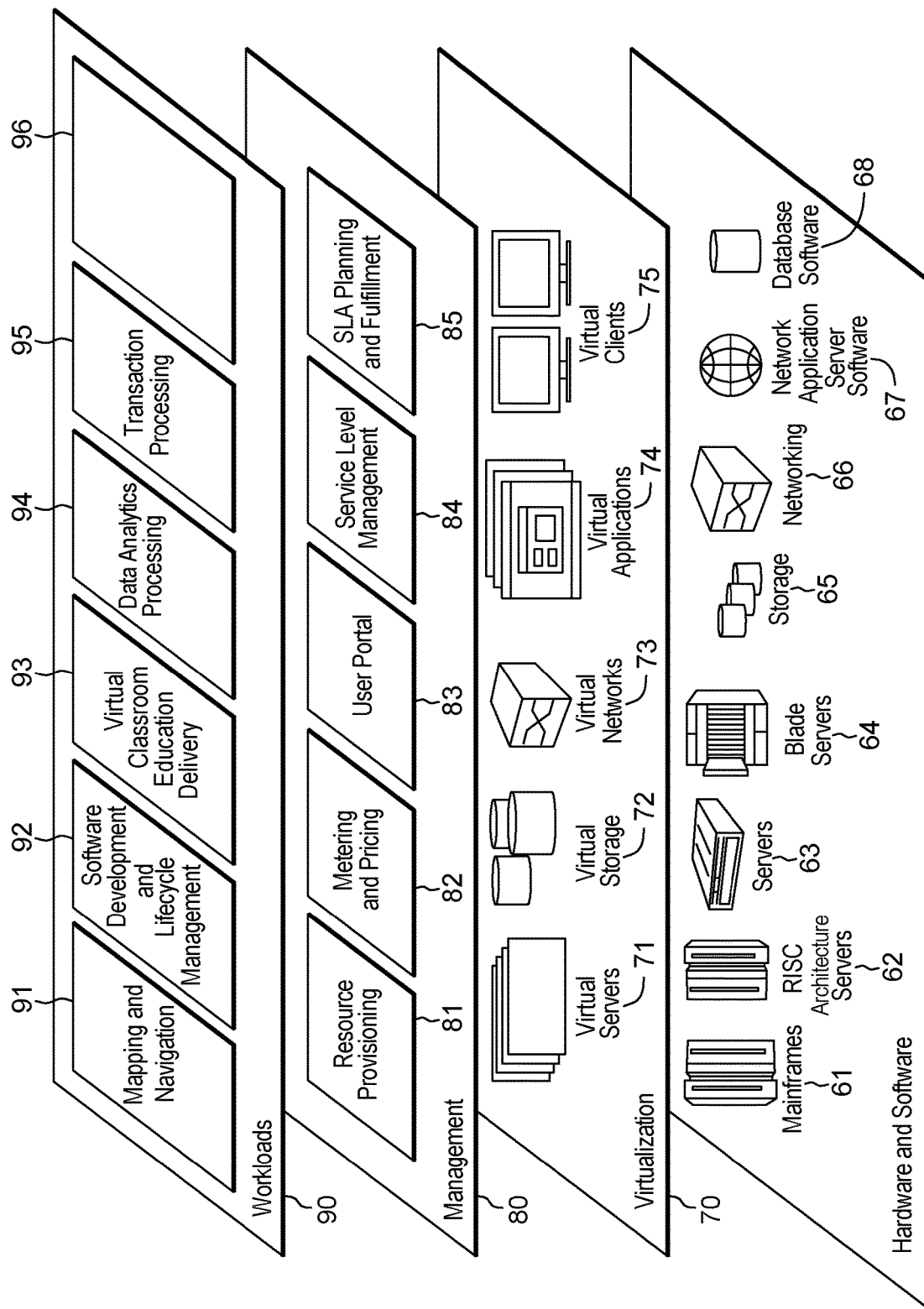
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatically determining a destination for a downloaded resource 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    monitoring, by one or more processors, browsing activity browsing activity of an application executing on a computing device, wherein the browsing activity comprises accessing content on various servers over a network connection, wherein a portion of the servers comprise sources for downloadable resources, and wherein the monitoring comprises analyzing, by the one or more processors, the sources to identify keywords and calculate densities of the keywords in content accessed at the sources;
    retaining, by the one or more processors, the keywords and the densities of the keywords in the content accessed at the sources in an historical record on one or more memories communicatively coupled to the computing device;
    downloading, by the one or more processors, from a given source of the sources, a resource, wherein the resource comprises data and metadata;
    updating, by the one or more processors, the metadata of the resource, wherein the updating comprises:
        analyzing, by the one or more processors, the resource to identify keywords and calculate densities of the keywords in the data comprising the resource;
        extracting, by the one or more processors, from the historical record, a portion of keywords and densities of the keywords in content accessed at the given source, wherein the keywords comprising the portion are equivalent to the keywords in the data comprising the resource;
        combining, by the one or more processors, the keywords and the densities of the keywords in the data comprising the resource and the portion to establish merged keywords and merged densities of merged keywords; and
        updating, by the one or more processors, the metadata of the resource with the merged keywords and the merged densities of merged keywords;
    determining, by the one or more processors, a destination for the downloaded resource, based on selecting, from a group of potential destinations, the destination comprising a highest percentage of attributes matching the updated metadata; and
    saving, by the one or more processors, the downloaded resource to the destination.

2. The computer-implemented method of claim 1, wherein analyzing the resource to identify keywords and calculate densities of the keywords in the data comprising the resource is performed contemporaneously with downloading the resource.

3. The computer-implemented method of claim 1, further comprising:
    generating, by the one or more processors, a name recommendation for the destination, where the generating is based on the attributes matching the updated metadata.

4. The computer-implemented method of claim 3, further comprising:
    naming, by the one or more processors, the destination based on the name recommendation.

5. The computer-implemented method of claim 1, where the group of potential destinations comprise nodes on a tree structure, and wherein each node comprises a folder.

6. The computer-implemented method of claim 5, wherein the destination attributes comprise an ordered linked list comprising featured words in weight order, wherein the weight order is based on a frequency of each featured word in files stored at the destination prior to the downloading.

7. The computer-implemented method of claim 1, wherein updating the metadata of the resource with the merged keywords and the merged densities of merged keywords comprises generating a hash map comprising the merged keywords and the merged densities of merged keywords.

8. The computer-implemented method of claim 1, wherein updating the metadata of the resource further comprises:
    extracting, by the one or more processors, from the historical record a second portion of keywords and densities of the keywords in content accessed at a portion of the sources, wherein the portion of the sources comprise sources accessed by the application within a predefined period of time before accessing the given source, wherein the keywords comprising the second portion are equivalent to the keywords in the data comprising the resource; and
    updating, by the one or more processors, the metadata of the resource based on the second portion.

9. The computer-implemented method of claim 1, further comprising:
    updating, by the one or more processors, the metadata of the resource to include an identifier of the given source; and
    retaining, by the one or more processors, at the destination, the metadata of the resource.

10. The computer-implemented method of claim 1, wherein determining the destination for the downloaded resource further comprises:
    generating, by the one or more processors, a data structure comprising a tree structure with nodes, wherein the potential destinations comprise the nodes.

11. The computer-implemented method of claim 10, wherein each node of the nodes comprises attributes stored in a linked list.

12. The computer-implemented method of claim 11, further comprising:
    updating, by the one or more processors, a value at the destination to reflect the highest percentage of attributes matching the updated metadata, where the value comprises an entry of a linked list of a node comprising the destination.

13. A computer program product comprising:
a computer readable storage medium readable by one or more processors and storing instructions for execution by the one or more processors for performing a method comprising:
  monitoring, by the one or more processors, browsing activity browsing activity of an application executing on a computing device, wherein the browsing activity comprises accessing content on various servers over a network connection, wherein a portion of the servers comprise sources for downloadable resources, and wherein the monitoring comprises analyzing, by the one or more processors, the sources to identify keywords and calculate densities of the keywords in content accessed at the sources;
  retaining, by the one or more processors, the keywords and the densities of the keywords in the content accessed at the sources in an historical record on one or more memories communicatively coupled to the computing device;
  downloading, by the one or more processors, from a given source of the sources, a resource, wherein the resource comprises data and metadata;
  updating, by the one or more processors, the metadata of the resource, wherein the updating comprises:
    analyzing, by the one or more processors, the resource to identify keywords and calculate densities of the keywords in the data comprising the resource;
    extracting, by the one or more processors, from the historical record, a portion of keywords and densities of the keywords in content accessed at the given source, wherein the keywords comprising the portion are equivalent to the keywords in the data comprising the resource;
    combining, by the one or more processors, the keywords and the densities of the keywords in the data comprising the resource and the portion to establish merged keywords and merged densities of merged keywords; and
    updating, by the one or more processors, the metadata of the resource with the merged keywords and the merged densities of merged keywords;
  determining, by the one or more processors, a destination for the downloaded resource, based on selecting, from a group of potential destinations, the destination comprising a highest percentage of attributes matching the updated metadata; and
  saving, by the one or more processors, the downloaded resource to the destination.

14. The computer program product of claim 13, the method further comprising:
  generating, by the one or more processors, a name recommendation for the destination, where the generating is based on the attributes matching the updated metadata.

15. The computer program product of claim 14, the method further comprising:
  naming, by the one or more processors, the destination based on the name recommendation.

16. The computer program product of claim 13, where the group of potential destinations comprise nodes on a tree structure, and wherein each node comprises a folder.

17. The computer program product of claim 16, wherein the destination attributes comprise an ordered linked list comprising featured words in weight order, wherein the weight order is based on a frequency of each featured word in files stored at the destination prior to the downloading.

18. The computer program product of claim 13, wherein updating the metadata of the resource with the merged keywords and the merged densities of merged keywords comprises generating a hash map comprising the merged keywords and the merged densities of merged keywords.

19. The computer program product of claim 13, wherein updating the metadata of the resource further comprises:
  extracting, by the one or more processors, from the historical record a second portion of keywords and densities of the keywords in content accessed at a portion of the sources, wherein the portion of the sources comprise sources accessed by the application within a predefined period of time before accessing the given source, wherein the keywords comprising the second portion are equivalent to the keywords in the data comprising the resource; and
  updating, by the one or more processors, the metadata of the resource based on the second portion.

20. A system comprising:
a memory;
one or more processors in communication with the memory;
program instructions executable by the one or more processors via the memory to perform a method, the method comprising:
  monitoring, by the one or more processors, browsing activity browsing activity of an application executing on a computing device, wherein the browsing activity comprises accessing content on various servers over a network connection, wherein a portion of the servers comprise sources for downloadable resources, and wherein the monitoring comprises analyzing, by the one or more processors, the sources to identify keywords and calculate densities of the keywords in content accessed at the sources;
  retaining, by the one or more processors, the keywords and the densities of the keywords in the content accessed at the sources in an historical record on one or more memories communicatively coupled to the computing device;
  downloading, by the one or more processors, from a given source of the sources, a resource, wherein the resource comprises data and metadata;
  updating, by the one or more processors, the metadata of the resource, wherein the updating comprises:
    analyzing, by the one or more processors, the resource to identify keywords and calculate densities of the keywords in the data comprising the resource;
    extracting, by the one or more processors, from the historical record, a portion of keywords and densities of the keywords in content accessed at the given source, wherein the keywords comprising the portion are equivalent to the keywords in the data comprising the resource;
    combining, by the one or more processors, the keywords and the densities of the keywords in the data comprising the resource and the portion to establish merged keywords and merged densities of merged keywords; and
    updating, by the one or more processors, the metadata of the resource with the merged keywords and the merged densities of merged keywords;
  determining, by the one or more processors, a destination for the downloaded resource, based on selecting, from a group of potential destinations, the destination comprising a highest percentage of attributes matching the updated metadata; and saving, by the one or more processors, the downloaded resource to the destination.

* * * * *